(12) United States Patent
Sanders

(10) Patent No.: US 11,763,245 B2
(45) Date of Patent: Sep. 19, 2023

(54) PASSWORD PROTECTED FOOD DELIVERY CARRY CASE WITH TEMPERATURE SMART TECHNOLOGY

(71) Applicant: Andrea Sanders, Philadelphia, PA (US)

(72) Inventor: Andrea Sanders, Philadelphia, PA (US)

(73) Assignee: Andrea Sanders, Philadelphia, PA (US)

( * ) Notice: Subject to any disclaimer, the term of this patent is extended or adjusted under 35 U.S.C. 154(b) by 48 days.

(21) Appl. No.: 17/096,555

(22) Filed: Nov. 12, 2020

(65) Prior Publication Data

US 2021/0142270 A1     May 13, 2021

Related U.S. Application Data

(60) Provisional application No. 62/934,102, filed on Nov. 12, 2019.

(51) Int. Cl.
*G06Q 10/0832*    (2023.01)
*G07C 9/00*    (2020.01)

(52) U.S. Cl.
CPC ..... *G06Q 10/0832* (2013.01); *G07C 9/00182* (2013.01)

(58) Field of Classification Search
CPC ............... G06Q 10/083–0832; G07C 9/00182
USPC .......................................................... 705/332
See application file for complete search history.

(56) References Cited

U.S. PATENT DOCUMENTS

| | | | | |
|---|---|---|---|---|
| 3,790,735 | A * | 2/1974 | Peters, Jr. | H05B 6/129 |
| | | | | 219/622 |
| 4,593,676 | A * | 6/1986 | Wackerman | F24C 14/025 |
| | | | | 126/41 R |
| 6,483,089 | B1 * | 11/2002 | Wright | A47J 47/14 |
| | | | | 126/246 |
| 10,546,266 | B1 * | 1/2020 | Bose | H04L 67/52 |
| 2002/0040564 | A1 | 4/2002 | Killingbeck et al. | |
| 2004/0108938 | A1 | 6/2004 | Entrekin | |
| 2008/0191867 | A1 * | 8/2008 | Markovich | G07C 9/00912 |
| | | | | 340/539.11 |
| 2016/0338539 | A1 * | 11/2016 | Storek | A23L 11/10 |
| 2017/0310770 | A1 * | 10/2017 | Samaan | H04L 45/306 |
| 2018/0121873 | A1 * | 5/2018 | Walsh | G06Q 10/0836 |
| 2018/0336515 | A1 * | 11/2018 | Mehring | H04L 9/0637 |
| 2019/0039874 | A1 * | 2/2019 | Bey | A47J 31/521 |
| 2019/0049988 | A1 * | 2/2019 | Meij | G05D 1/0274 |

(Continued)

OTHER PUBLICATIONS

Maytag Appliances Sales Co. "Range Use and Care Guide" Part No. 8113P695-60. 2006. p. 1-19. (Year: 2006).*

*Primary Examiner* — Jeff Zimmerman
*Assistant Examiner* — Brian A Tallman
(74) *Attorney, Agent, or Firm* — Armstrong Teasdale LLP

(57) ABSTRACT

A secure transport case having multiple compartments protects consumables from interference during delivery between a restaurant and a consumer. Multiple compartments provide temperature smart technology to maintain a desired temperature of the consumables during transit. A locking mechanism of the transport case is kept locked during transit and is unlocked by a secret key by the consumer. A mobile application is provided to a user to place an order, monitor the status of the secure transport case, the order itself, and to receive the secret code to unlock the secure transport case upon delivery.

13 Claims, 5 Drawing Sheets

(56) References Cited

U.S. PATENT DOCUMENTS

| | | | |
|---|---|---|---|
| 2019/0112119 A1* | 4/2019 | Alexander | F25D 11/003 |
| 2019/0277552 A1* | 9/2019 | Vu | F25D 23/025 |
| 2020/0230269 A1* | 7/2020 | Fotheringham | C02F 1/325 |
| 2020/0250611 A1* | 8/2020 | Pourteymour | G06F 9/542 |
| 2020/0261612 A1* | 8/2020 | Wei | B08B 9/08 |
| 2020/0387863 A1* | 12/2020 | Ruth | G06F 9/542 |

* cited by examiner

PASSWORD PROTECTED FOOD DELIVERY CARRY CASE WITH TEMPERATURE SMART TECHNOLOGY

PRIORITY

This application claims the benefit of U.S. Provisional 62/934,102, filed Nov. 12, 2020, and which is hereby incorporated by reference in its entirety.

FIELD OF THE INVENTION

The present disclosure relates to systems and methods for secure food delivery, and more particularly, to systems and methods for protecting consumables in transit utilizing a secure case.

BACKGROUND

Third party food delivery services are frequently used by millions of Americans. Instead of calling a restaurant directly and spending the time to travel to the restaurant, many consumers utilize food delivery services. Food delivery services, such as GrubHub® or DoorDash® partner with restaurants and provide consumers with an interface to place an order and provide additional information, such as payment and delivery instructions (e.g., address). A delivery person then picks up the order from the restaurant and transports the consumer's order to the consumer in accordance with the delivery instructions. Typically, ordered food is delivered in containers provided by the restaurant, such as a paper or plastic bag for solid foods and a drink carrier for liquids. Problems arise when a consumer is unsure if the order has been tampered with, such as by the delivery person taking a few sips from the drink, or swiping one or two fries. Other issues arise if delivered items, which are meant to be served hot, arrive lukewarm or cold, and vice versa.

U.S. Patent Application Publication No. 2002/0040564 A1, applied for by Killingbeck et al. ("the Killingbeck system"), describes a system and method for delivering containers filled with goods, such as groceries and foodstuffs. A delivery order of the Killingbeck system is taken from a customer for a set of goods, the set of goods ordered by the customer are packed in a container, and the container is transported to the customer's location. In the Killingbeck system, the container is locked to a docking station and is removed by the customer using a key.

U.S. Patent Application Publication No. 2004/0108938 A1, applied for by Entrekin ("the Entrekin system"), described a system and method for controlling the locking and unlocking of a container or trailer. The Entrekin system provides lock data loaded from a source computer to a lock memory of the container. Once the container reaches an intended recipient, the recipient enters user data via a keypad of the container. If the user data and lock data match, the container's electronic lock is unlocked.

Accordingly, there exists a need for providing secure delivery of consumables by a third party between a restaurant and a consumer.

BRIEF SUMMARY

The present embodiments may relate to, inter alia, systems and methods for protecting consumables in transit between an origin and a final destination. In one embodiment, for example, an origin may be a restaurant and the final destination may be a location specified by a customer of the restaurant, such as their home address or a work address, or the like. In some embodiments, consumables may be stored in a secure manner in a carrying case for transportation between a restaurant and a consumer by a third party, such as a delivery service unaffiliated with the restaurant in an official capacity. In some embodiments, a user may place an order via a mobile application. Once an order is placed, the mobile application may, for example, submit the order to a certain restaurant for preparation. Additionally, the mobile application may be enabled to notify a delivery driver of the order to be delivered from the certain restaurant to the user. In some embodiments, the delivery driver may provide a secure case to transport the order to the user. In another embodiment, the restaurant may provide a secure case for transportation. Once the secure case is loaded with items, the secure case may be locked then transported to the user. The user may then open the secure case using a passcode or other means of unlocking and receive the order. In this example, the delivery person would not be privy to the unlock code for the secure case.

A further enhancement of the secure case may include having a plurality of compartments enabled to hold different types of food items (e.g., hot or cold) and non-food items (e.g., straws or utensils). The secure case may be comprised of lightweight materials, such as rubber, plastic, aluminum, or the like. In yet another embodiment, the plurality of compartments may be insulated to keep the food items fresh. Some embodiments may include one or more sensors to activate heating or cooling elements and enable smart temperature technology.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
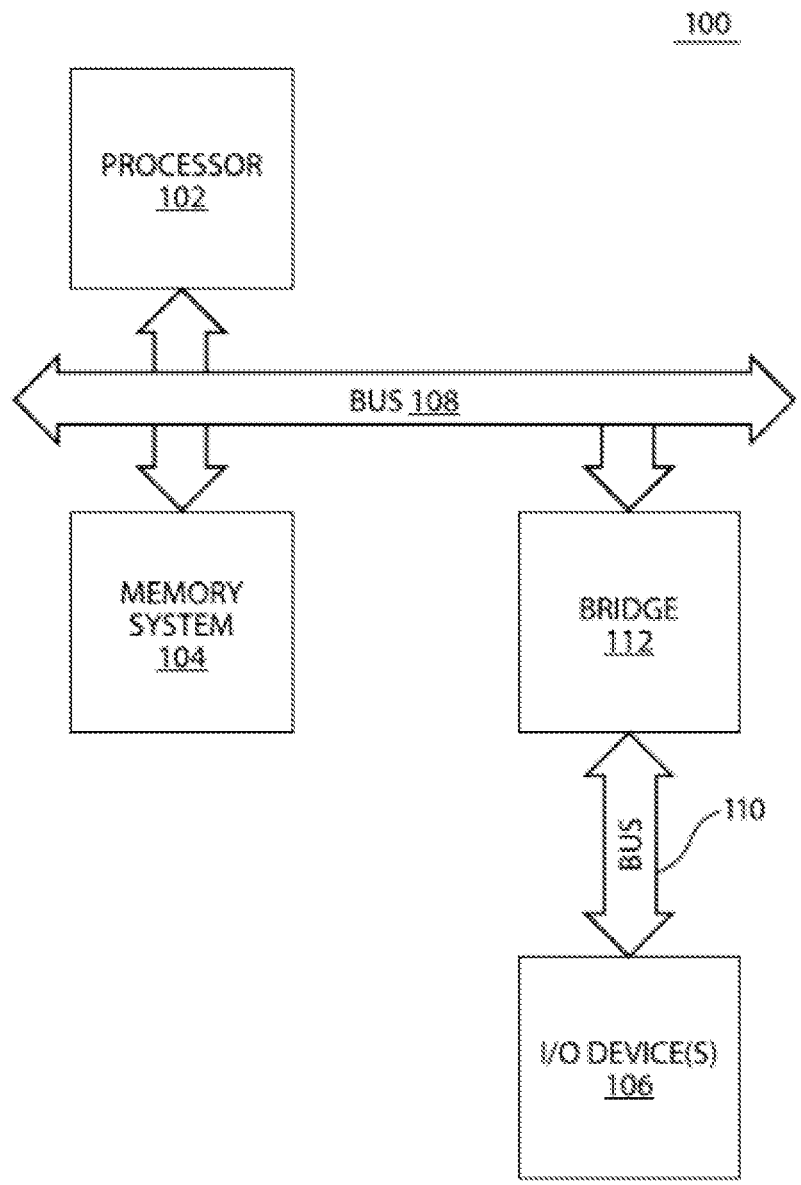
FIG. 1 illustrates a simplified functional block diagram of a computer system in accordance with the embodiments of the disclosed invention.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for the secure delivery of goods between a source, such as a restaurant, and a destination, such as a consumer. In some embodiments, the systems and methods described herein may include receiving an order from a consumer, creating an order request to a restaurant as specified by the consumer, and creating a delivery request to a delivery person. The systems and methods may further include having the delivery person transport ordered items from the restaurant to the ordering consumer to an address specified by the order. Some embodiments may include the transportation of the order in a secure delivery case, wherein the case may only be opened using a key (e.g., password, passcode, PIN, etc.) known only to a select few (e.g., restaurant manager, consumer who placed order).

In some embodiments, a secure transport case may include a plurality of compartments. The secure transport case may be comprised of lightweight materials, such as rubber, plastic, aluminum, metal, or a combination thereof. In some embodiments the transport case may include a locking mechanism operable to ensure the security of goods transported within the case. The locking mechanism may be activated by an input code via a keypad, a graphical user interface, a QR code, or the like. In some embodiments, two-factor or even multi-factor authentication may be utilized to secure the case. In some embodiments, symmetric or asymmetric cryptography may be used to provide an additional layer of security utilizing public and private keys. It is understood that the disclosed invention is not limited to any certain type of security infrastructure.

In some embodiments, a food delivery computing device may provide a mobile application to a user to enable that user to place an order. The mobile application, for example, may provide a portal to a plurality of different restaurants and their respective menus to order from. In one embodiment, the mobile application may be operated by a third party unaffiliated with any specific restaurant. The third party may employ a series of delivery persons. In some embodiments, the delivery persons may be independent contractors. Once an order is placed, at least one of the delivery persons may be selected to provide delivery services from a certain restaurant, as specified by the order, to a certain location, which may also be specified by the order. Once packed with the order, a case may be secured at the restaurant. In some embodiments, a locking mechanism on the case may be locked by depressing a 'lock' button. Alternatively, the locking mechanism may be locked using a code. The code may be provided to the restaurant, for example, by the third party.

In some embodiments, a mobile application of the food delivery computing device may provide order status to a user. For example, a user that has placed an order may be provided with a status bar indicating progress of their order. In some embodiments, app notifications may be generated in response to a status change. For example, once an order has been picked up or is in transit, a user may be notified of such actions. Additionally, or alternatively, once the order has been packed into a case, the location of the case may be conveyed via an interface of the mobile application. For example, the interface may provide a map view and highlight on the map a current location of the case. In some embodiments, the case may include one or more sensors, such as GPS sensors, that may provide real-time location of the case. In some embodiments, the case may be equipped with other sensors, such as an accelerometer and a gyroscope. Based on information provided by the accelerometer and/or gyroscope, other status information pertaining to the case may be provided. For example, safety of the food may be determined based on orientation information of the case. In some embodiments, a tip-over event may be detected causing an alert being sent.

FIG. 1 is an example of a simplified functional block diagram of a computer system 100. The functional descriptions of the present invention may be implemented in hardware, software or some combination thereof.

As shown in FIG. 1, the example computer system 100 may include a processor 102, a memory system 104 and one or more input/output (I/O) devices 106 in communication by a communication 'fabric'. The communication fabric may be implemented in a variety of ways and may include one or more computer buses 108, 110 and/or bridge and/or router devices 112 as shown in FIG. 1. The I/O devices 106 may include network adapters and/or mass storage devices from which the computer system 100 may send and receive data for generating and transmitting advertisements with endorsements and associated news. The computer system 100 may be in communication with the Internet via the I/O devices 108.

Figure 2:
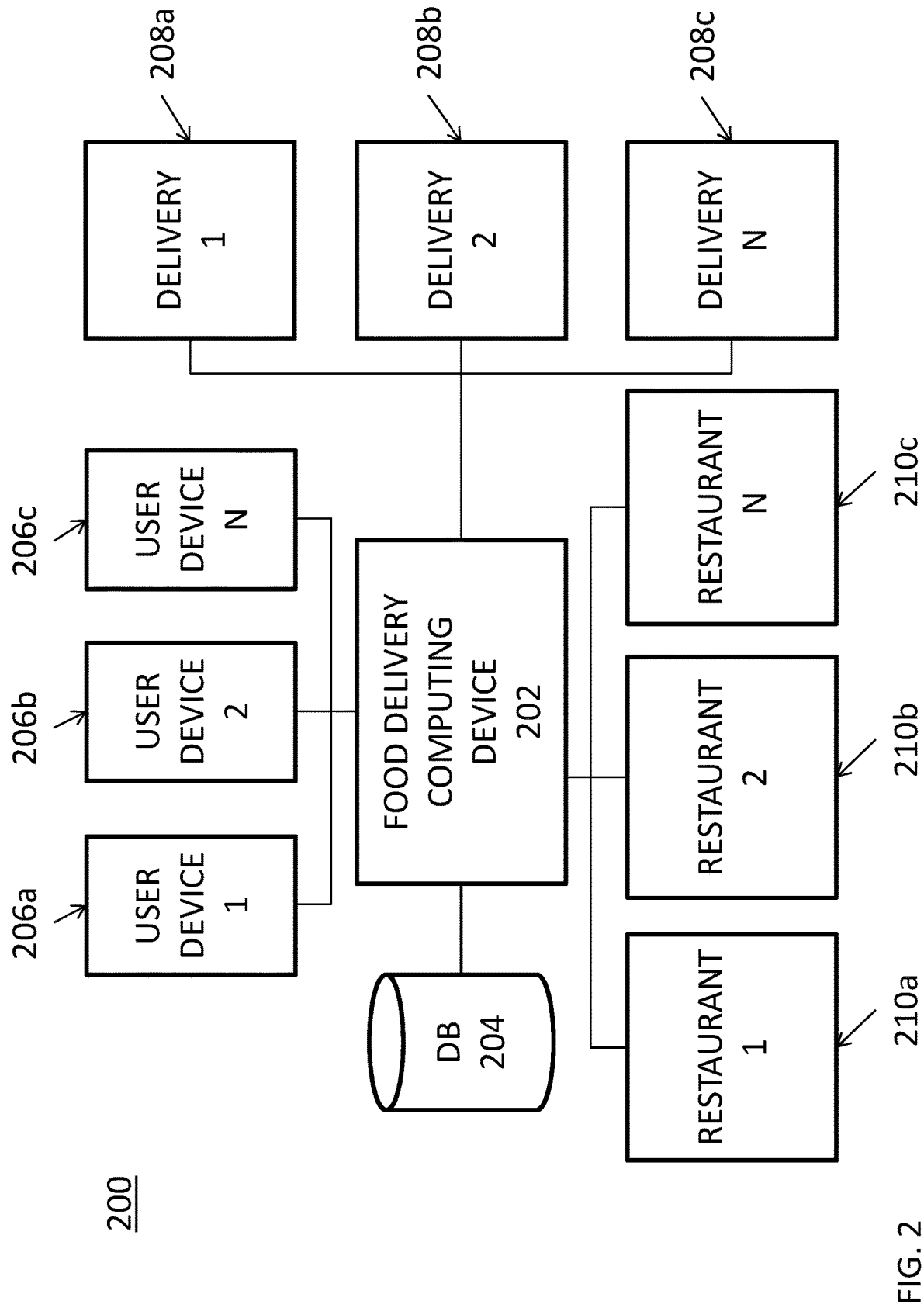
FIG. 2 illustrates a simplified functional block diagram of one or more components in accordance with the embodiments of the disclosed invention.

FIG. 2 depicts an example food delivery (FD) system 200. FD system 200 may include a FD computing device 202. FD computing device 202 may be communicatively coupled to a database 204. FD computing device 202 may also be in communication with a plurality of user devices 1, 2, . . . N, illustrated as example user devices 206*a*, 206*b*, and 206*c*, respectively. The plurality of user devices may be, for example, mobile computing devices, portable computers, tablet PCs, or the like. FD computing device 202 may be in communication with a plurality of delivery entities 1, 2, . . . N, illustrated as example delivery entities 208*a*, 208*b*, and 208*c*, respectively. Delivery entities may utilize personal computing devices, such as mobile computing devices, portable computers, tablet PCs, or the like. Even further, FD computing device 202 may be in communication with a plurality of restaurant locations 1, 2, . . . N, illustrated as example restaurant locations 210*a*, 210*b*, and 210*c*, respectively. It is understood that the FD system is not limited to a certain amount of user devices, delivery entities, or restaurant locations.

FD computing device 202 may receive food orders from user devices 206*a*, 206*b*, and/or 206*c*. User devices 206*a*, 206*b*, and 206*c*, may include components for receiving an order from a user, such as a mobile application that provides a graphical user interface, the interface including one or more options to order from based on menu information. Menu information may be provided, for example, by one or more restaurants, such as restaurants 210*a*, 210*b*, and 210*c*. In some embodiments, graphics may be provided along with price information. In other embodiments, menu data may be provided in a flat text file or in XML format. FD computing device 202 may subsequently send a food order to an appropriate restaurant, such as Restaurant 1, Restaurant 2, or Restaurant N, illustrated as 210*a*, 210*b*, or 210*c*, respectively. FD computing device 202 may additionally send work orders to at least one delivery entity, such as Delivery 1, Delivery 2, or Delivery N, illustrated as 208a, 208b, and 208c, respectively. Work orders may include adequate and appropriate information to complete a delivery of a food order from at least one of the specified restaurants 210a, 210b, or 210c, to the original user making the order, user 206a, 206b, or 206c. The food delivery may be made utilizing a secure food case described further herein and with respect to FIGS. 3 and 4.

In some embodiments FD computer device 202 may automatically determine the best delivery person amongst a pool of delivery persons available, such as delivery driver 208a, 208b, or 208c. Determination may be made based on a selection process using certain algorithms. In one example, a proximity-based algorithm may be used. Such as, for example, a delivery driver may be selected based on a myriad of factors. Factors may include, for example, the driver's proximity or closeness to the user geographically, the driver's proximity or closeness to the restaurant geographically, or a combination thereof. Other factors may be considered, such as, for example, the reputation of the delivery driver, their past performance (e.g., timeliness, dependability), seniority with respect to other available delivery drivers, or a combination thereof.

Figure 3:
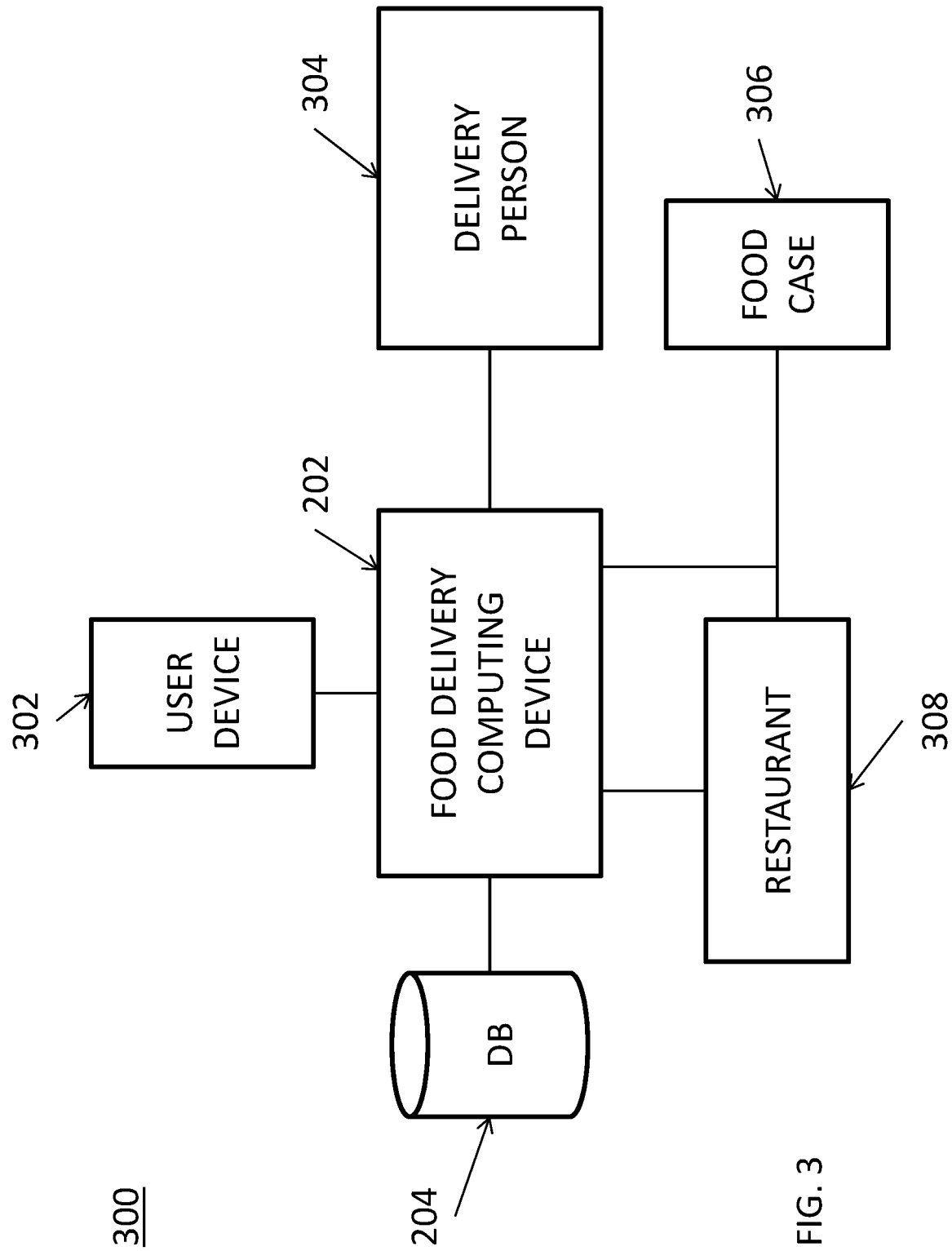
FIG. 3 illustrates an exemplary block diagram in accordance with at least one embodiment of the disclosed invention.

FIG. 3 depicts an example Food Delivery (FD) computing system 300. FD computing system 300 may include a Food Delivery (FD) Computing Device 202 as described above in conjunction with FIG. 2. FD computing device 202 may receive an order from an example user device 302 via a communication means, such as via a network. An example network may be the Internet. As described herein and above, a user may place an order via a mobile application, a desktop application, or the like. Once an order is received, the order may be sent to a restaurant, such as restaurant 308, which is in communication with FD computing device 202. FD computing device 202 may also send, concurrently with the restaurant order, a delivery order to at least one delivery person, such as delivery person 304, for example. FD computing device 202 may be in network communication with restaurant 308 and delivery person 304. During preparation, restaurant 308 may load the ordered items into a food case. The food case may be supplied by an external party (not shown), the restaurant 308, or the delivery person 304. In some embodiments, the food case 306 may be a reusable container or a single-use container, for example. In some embodiments, food case may be constructed of lightweight materials. For example, food case 306 may be comprised of such materials as rubber, plastic, aluminum, metal, or a combination thereof. In some embodiments, once an order has been fully loaded into the food case 306, a locking mechanism of the food case may be locked, thereby locking the case. In some embodiments, the food case 306 may automatically lock once the case is shut. Alternatively, the food case may lock in response to an action by a user, such as a button press to 'lock' or the flipping of a manual switch to lock the case, for example. Once locked, only those in possession of a secret key, such as an unlock code, for example, may be able to unlock the case. Only a select few may be privy to the unlock code, such as a manager of the restaurant 308, an administrator of the FD computing device 202, or the user of user device 302.

In some embodiments, food case 306 may include a keypad or graphical user interface. The food case may be unlocked by entering the unlock code, or secret key, via a keypad or graphical user interface of the food case 306. Alternatively, the food case 306 may be equipped with a scanner, such as a bar code scanner or a QR code scanner. The scanner may be enabled to scan a code displayed by the mobile application on a user's device 302. In some embodiments, the locking mechanism may unlock in response to a signal transmitted via near-field communications. Alternatively, the locking mechanism may unlock based on geographical data. For example, the FD computing device may detect that the food case 306 has arrived at a certain location specified by the user and send an unlock signal to the food case's locking mechanism.

Figure 4:
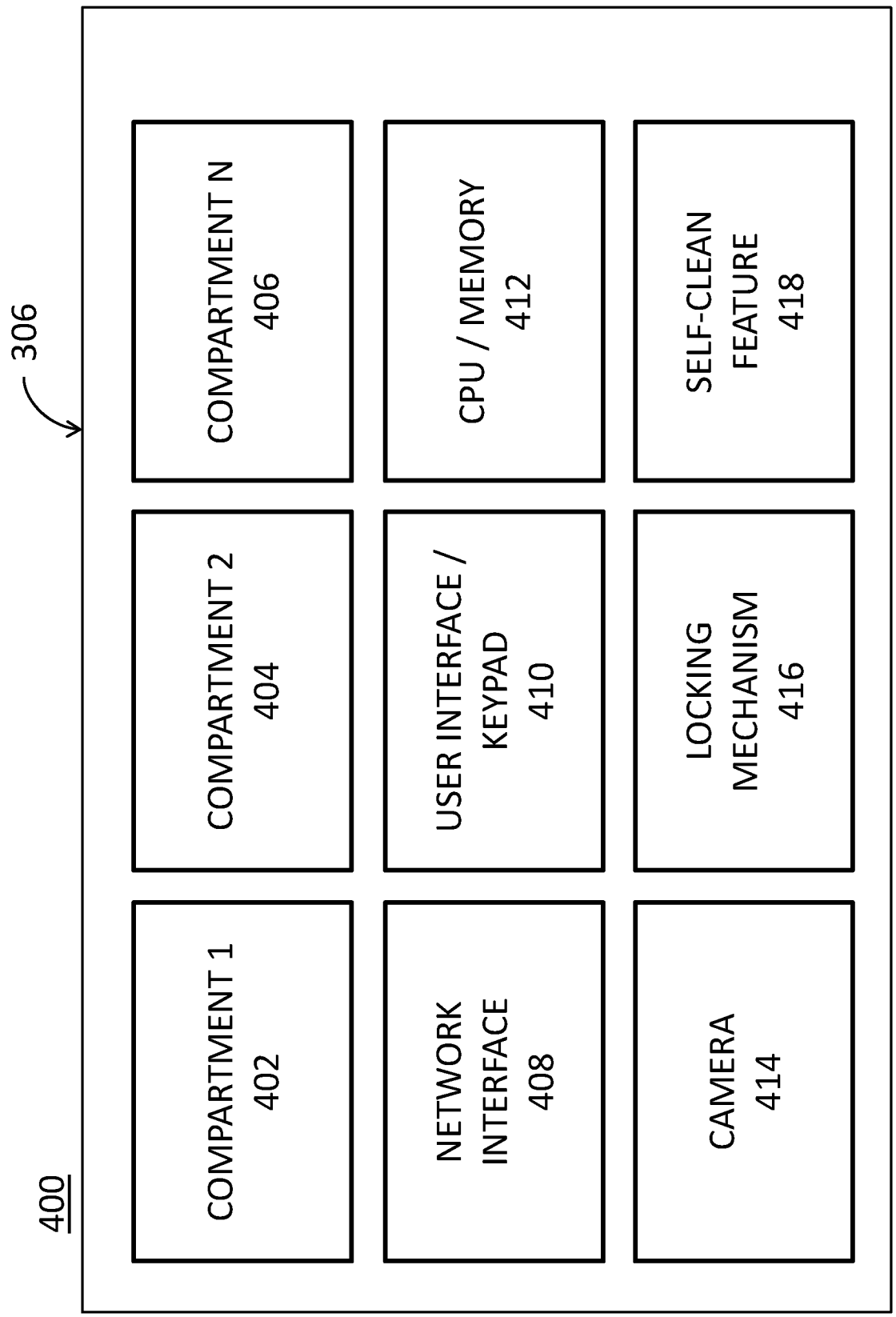
FIG. 4 illustrates exemplary components of a secure case in accordance with at least one embodiment of the disclosed invention.

FIG. 4 depicts a diagram 400 of an example food case 306. Food case 306 may include a plurality of components shown for illustrative purposes only and are not meant to be limiting in any way. Food case 306 may include less or more than the components shown in diagram 400. Food case 306 may include a plurality of compartments, such as compartment 1, compartment 2, and compartment N, labeled as 402, 404, and 406, respectively. The plurality of compartments may be of differing sizes and/or configurations. For example, one of the compartments may be sized to hold a hot or cold drink. Insulation for the compartment may be provided to maintain a drink's temperature. Further, the compartment may include one or more clips or bands to hold a drink in place and prevent spillage. Another one of the compartments may be provided to store perishable food items. Alternatively, multiple compartments may be used to store hot and cold food items separately. Food compartments may be insulated to maintain temperature. Alternatively, compartments may provide for the holding of ice pack containers or heat pads. In another embodiment, smart temperature technology may be provided to regulate temperature for warm/cold food and hot/cold drinks. For example, heating coils may be provided that may be activated in response to the determining that a food's internal temperature has gone below a certain threshold. Other features may be provided as well, such as cooling vents or portable refrigerator elements, for example. Another one of the compartments may be provided to hold non-perishable goods, such as plastic utensils, paper plates, napkins, or the like.

Food case 306 may include a network interface 408. Network interface 408 may provide wired or wireless network connectivity for the sending and receiving of information. Network interface 408 may also include near field communications capability or short-range communications, such as Bluetooth, or the like. Food case 306 may further include a graphical user interface, or keypad, that may be used to lock or unlock a locking mechanism 416 of the case, accept input from a user, such as an unlock code, or adjust settings of the food case 306. A CPU and memory 412 of case 306 may be utilized to provide storage of data, such as the unlock code, programming of the case's locking mechanism, geographical data of the case, such as via a GPS device (not shown), or different operations of the case with respect to temperature control, for example. Further, settings created for the food case 306 may be stored in the memory.

Food case 306 may include a camera 414. Camera 414 may be in the form of a code scanner. In some embodiments, an unlock code may be displayed on a user's mobile device. Camera 414 may scan the displayed unlock code and, if the code is valid, the locking mechanism 416 may be placed into an unlock mode. A displayed code may be in the form of a QR code or a bar code, for example. In response to a proper code, the locking mechanism may be placed into an unlock position and the goods may be retrieved from the series of utilized compartments. In at least one example embodiment, only the user that had placed the order originally would be provided with the code. In other embodiments, the secret code may be shared amongst a circle of trusted users, such as other users the original user shared the code with, an administrator of the FD computing system, or even a manager or supervisor at the restaurant where the order was picked up from by the delivery person.

An additional component of food case 306 may be a self-cleaning feature 418. After each use, and upon closure, the case may go into a self-cleaning mode in order to sanitize the plurality of compartments of the case. In some embodiments, the self-cleaning feature may be activated by an instruction received, such as by a selection made by an operator via the graphical user interface, for example.

In some embodiments, food case 306 may be equipped with at least one handle on at least one side. The at least one handle may be used to help, for example, lifting and/or transporting food case 306. The at least one handle may take on various embodiments that could be construed to be a handle by one of ordinary skill in the art.

In some embodiments, food case 306 may be equipped with special corners. Such special corners may help to, for example, ensure the case does not roll over while set down. In this way and others, such special corners may help to protect the contents of food case 306 among other things.

Figure 5:
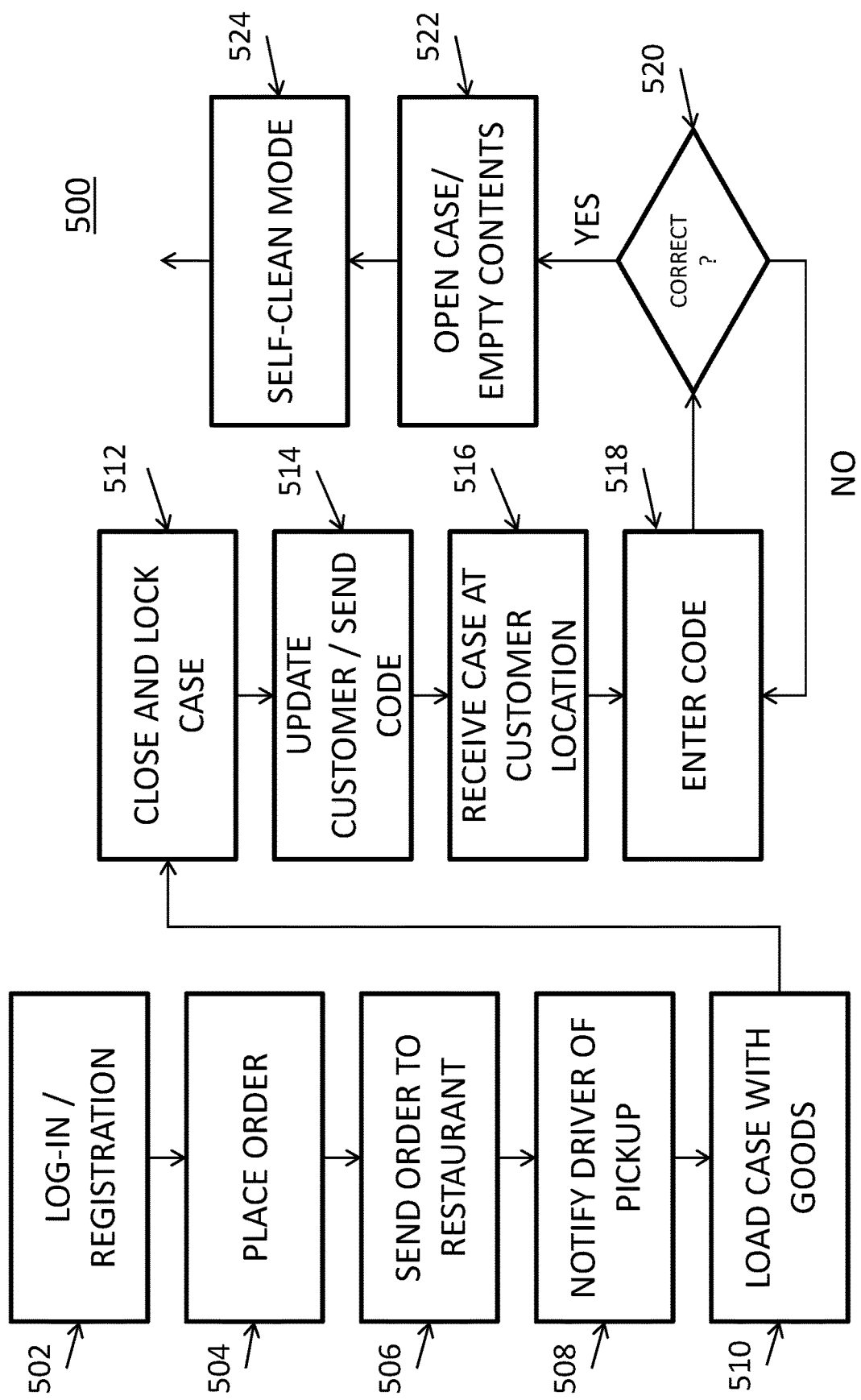
FIG. 5 illustrates an exemplary workflow diagram in accordance with at least one embodiment of the disclosed invention.

FIG. 5 illustrates an exemplary workflow diagram 500 of example embodiments of the disclosed invention. In step 502, a user, such a consumer or diner, may access a mobile application and provide user credentials. In some embodiments, if a user is not registered, the user may be given the opportunity to register with the mobile application. Alternatively, the user may perform a log-in or registration via web page, or the like. For simplicity, the example embodiment of a mobile application will be described however it is understood that a mobile application usage is not meant to be limiting but merely illustrative. In step 504, a user may place an order from a certain restaurant, such as one of the restaurants 210a, 210b, or 210c of FIG. 2. A user may be shown different menus associated with different restaurants during the ordering process. A user may select different food items, such as hot or cold drinks, and/or food items, such as hot/cold dishes, sides, and other types of food items, for example. Once an order is placed (i.e. finalize purchase, payment made, etc.), the placed order may be transmitted to an appropriate restaurant, step 506. Concurrently, in step 508, a delivery request may be transmitted to one or more delivery drivers. In some embodiments, a pool of available drivers may be selected from based on certain parameters. For example, a certain driver may be selected based on their proximity to the restaurant for pickup, seniority of the driver, driver reputation, a capability to provide a secure transport case, or a combination thereof. Once a selected driver arrives at the restaurant for pickup of food items, the ordered food items may be loaded 510 into one or more compartments as described above with respect to FIG. 4. Once loaded, smart technology features of the case may be activated.

In step 512, once loading of the case is complete, the case may be closed and locked. In some embodiments, the case may lock automatically once the case is closed. Alternatively, the case may lock in response to an action, such as the press of a button to lock the case via a graphical user interface of the case or a physical button, for example. Once in transit, the user may receive a notification in step 514 along with a secret code to unlock the case upon delivery. In some embodiments the notification may be sent via a message within the mobile application. Alternatively, the notification may be sent as a text message, an email, or by phone call, for example. The notification may also include the status of the case (i.e. in transit, about to arrive, etc.). The status may also include a history of the case's location and lock/unlock history. Delivery is achieved in step 516 and the user, or customer, may enter the code at step 518. The secret code may take on a plurality of different forms. For example, the code may simply be a PIN code (e.g., 4-8 digit passcode), a QR code or some other barcode for scanning by a camera sensor of the case, or even an alphanumeric passcode generated by another source or the customer themselves. At 520, if the passcode is incorrect, the user may be prompted to re-insert the code 518. If correct, the case may be opened 522 and the contents may be emptied from the case by the consumer.

Once a delivery is complete and the case has been emptied, the case may be closed and put into a self-clean mode. A self-cleaning operation may include the sanitization of the inside of the case and the multiple compartments. The case may include one or more vents for performing a self-cleaning operation. The self-cleaning operation may occur automatically based on a schedule. In other embodiments, the self-cleaning operation may occur in response to an action by a handler of the case. For example, the handler may place the case in self-clean mode via a graphical user interface of the case. Alternatively, the handler may place the case in self-clean mode via a mobile application setting on a handler's device. Once cleaned, the case may be placed into ready mode for another delivery.

In some embodiments, FD computer device 202 may include at least one additional capability. The at least one additional capability may include, for example, computing an estimated time at which the order will be delivered to user and outputting the resulting estimated time to a user via an application installed on user device and/or via SMS message to user device. The calculation may be completed and the resulting estimated time may be communicated to user upon completion of step 512, for example.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A portable food container, comprising:
an electronic lock, comprising a locking mechanism moveable between a locked position and an unlocked position;
a programmable memory and a processor;
one or more compartments having an open position and a closed position, the one or more compartments configured to:
receive one or more perishable food items; and
maintain an internal temperature of the one or more perishable food items;
the one or more compartments comprising one or more vents for performing a self-clean operation, the self-clean operation comprising a sanitization of an interior portion of the one or more compartments;
a network communication interface configured to send and receive one or more instructions from a remote computing device; and
an interface configured to receive at least a first input and a second input,
wherein, in response to the first input, the locking mechanism is configured to move to the locked position or the unlocked position;
wherein the portable food container is secure when the locking mechanism is in the locked position;
wherein the portable food container is not secure when the locking mechanism is in the unlocked position; and
wherein, the self-clean operation automatically occurs after each use and upon the one or more compartments moving to the closed position.

2. The portable food container of claim 1, wherein the locking mechanism locks the portable food container in response to receiving a lock signal from the remote computing device.

3. The portable food container of claim 1, wherein the locking mechanism unlocks the portable food container in response to receiving an unlock signal from the processor.

4. The portable food container of claim 3, wherein the unlock signal from the processor is transmitted in response to receiving a correct input via the interface.

5. The portable food container of claim 4, wherein the correct input is a code.

6. The portable food container of claim 5, wherein the code is transmitted from the remote computing device to a device of a user via an external network.

7. The portable food container of claim 5, wherein the code is transmitted from the remote computing device to a device of a user via a text message.

8. The portable food container of claim 5, wherein the code is transmitted from the remote computing device to a device of a user via a mobile application.

9. The portable food container of claim 5, wherein the code is transmitted from the remote computing device to a device of a user, wherein the user is the intended recipient of the one or more perishable food items, non-perishable food items, or non-food items.

10. The portable food container of claim 1, wherein the interface is a keypad.

11. The portable food container of claim 1, wherein the interface is a user interface.

12. A system for transporting goods, the system comprising:
   at least one user device comprising:
      a memory,
      a processor communicatively coupled to the memory, and
      a mobile application for ordering one or more consumables;
   a secure case comprising:
      a central processing unit;
      a memory communicatively-coupled to the central processing unit;
      at least one network interface communicatively-coupled to the central processing unit;
      at least one user interface communicatively-coupled to the central processing unit;
      an electronic lock moveable between a locked position and an unlocked position; and
      one or more compartments having an open position and a closed position, the one or more compartments configured to:
         hold one or more ordered consumables; and
         maintain an internal temperature of the one or more ordered consumables;
      the one or more compartments comprising one or more vents for performing a self-clean operation, the self-clean operation comprising a sanitization of an interior portion of the one or more compartments, the self-clean operation automatically occurring after each use and upon the one or more compartments moving to the closed position.

13. The system of claim 12, wherein the at least one user interface comprises a keypad.

* * * * *